(12) United States Patent
Grisak

(10) Patent No.: US 10,641,920 B2
(45) Date of Patent: May 5, 2020

(54) SYSTEM, DEVICE, AND METHOD FOR MONITORING AND CONTROLLING THE POSITION OF A REMOTE OBJECT

(71) Applicant: Garadget Inc., Grand Junction, CO (US)

(72) Inventor: Denis Grisak, Grand Junction, CO (US)

(73) Assignee: Garadget Inc., Grand Junction, CO (US)

( * ) Notice: Subject to any disclaimer, the term of this patent is extended or adjusted under 35 U.S.C. 154(b) by 0 days.

(21) Appl. No.: 16/120,423

(22) Filed: Sep. 3, 2018

(65) Prior Publication Data

US 2019/0018167 A1   Jan. 17, 2019

Related U.S. Application Data

(63) Continuation of application No. 15/414,758, filed on Jan. 25, 2017, now Pat. No. 10,145,981.

(60) Provisional application No. 62/294,886, filed on Feb. 12, 2016.

(51) Int. Cl.
*G01V 8/14* (2006.01)

(52) U.S. Cl.
CPC ..................... *G01V 8/14* (2013.01)

(58) Field of Classification Search
CPC . B29C 66/71; B29C 2791/006; B29C 51/082; B29C 51/10; B29C 51/266; B29C 65/02; B29C 65/48; B29C 66/1122; B29C 66/133; B29C 66/242; B29C 66/24243; B29C 66/433; B29C 66/729; B29C 66/7294; B29K 2023/083; B29K 2083/00; B29K 2711/00; G01V 8/14; A41D 1/02; A41D 3/00; A41D 3/02; A41H 43/00; B29L 2031/48; B29L 2031/485; B32B 2250/44; B32B 2262/02; B32B 2262/08; B32B 2307/31; B32B 2307/738; B32B 2437/00; B32B 27/12; B32B 27/283; B32B 27/306; B32B 3/18; B32B 3/30; B32B 5/022; B32B 5/26; B32B 7/04; B32B 7/14
USPC .................................. 356/614–640
See application file for complete search history.

(56) References Cited

U.S. PATENT DOCUMENTS

2004/0042637 A1* 3/2004 Beale ................ G06F 3/011
382/103

* cited by examiner

*Primary Examiner* — Tri T Ton
(74) *Attorney, Agent, or Firm* — Intellent Patents LLC; Ahmed Alhafidh

(57) ABSTRACT

Various controllers herein detect a remote object's change of position. A controller emits a laser through a laser emitter at the remote object and measures an intensity of light reflected back to the controller through a photosensor disposed in proximity to the laser emitter. The surface of the remote object comprises a retroreflective portion, which reflects most of the laser beam's light in the direction it came from. A change in the remote object's position is detected when the intensity of light measured is substantially different after altering a factor of the laser emitter, such as power state.

3 Claims, 4 Drawing Sheets

SYSTEM, DEVICE, AND METHOD FOR MONITORING AND CONTROLLING THE POSITION OF A REMOTE OBJECT

CLAIM OF PRIORITY

This application is a continuation of U.S. Patent Publication No. 2017/0235014 filed Jan. 25, 2017, which claims priority to U.S. Provisional Patent Application Ser. No. 62/294,886, filed Feb. 12, 2016, the entire disclosures of which are hereby expressly incorporated by reference herein.

FIELD OF TECHNOLOGY

This disclosure relates generally to position monitoring devices. More particularly, the disclosure pertains to a device configured to detect a position of a remote object, notify coupled devices of the position, and integrate with other monitoring and control devices and systems.

BACKGROUND

Many objects transition between a number of predefined positions (e.g. an open or closed state of a door, gate, or window). Some of these objects must be in a certain position in order to prevent security from being compromised or disasters from propagating to other spaces. However, forgetting to lock a door, close a gate, or close a window happens all too often due to human error, often leading to pest invasion, burglary, theft, or even death. For example, leaving a garage door open overnight could easily lead to a rat infestation, or trespass and theft by a burglar.

Existing solutions for detecting the position of an object rely on wired sensors, causing installation of such solutions by an end-user to be difficult or confusing. Some solutions require a separate battery-powered module, which reduces reliability and requires regular maintenance. Since existing solutions are likely operated in non-heated environments, the lifespan of the battery may be vastly reduced, thus requiring replacement at short intervals. The need for regular maintenance leaves room for the same kind of human error described above.

Thus there exists the need for a device requiring little to no maintenance that wirelessly monitors and notifies the position of an object, integrates and interacts with existing actuation, security or automation systems, utilizes AC power, and aids in reducing the risk of security breaches or catastrophes from taking place due to human error.

REFERENCE LIST FOR DRAWINGS

Figure 1:
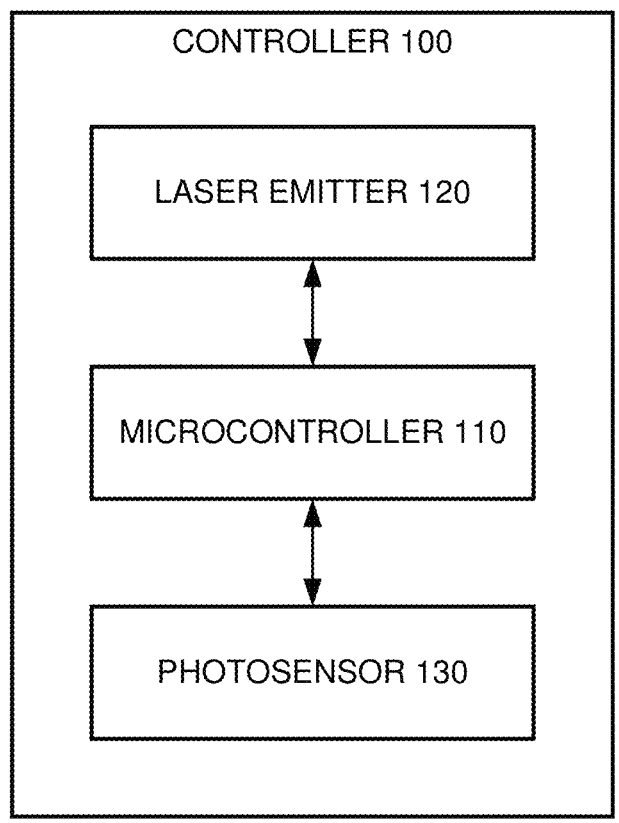
FIG. 1 is a block diagram of a controller for determining position of a remote object.

X below indicates the number of the Figure in which the element is introduced.
 X00—controller
 X01—housing
 X10—microcontroller
 X12—control circuit
 X20—laser emitter
 X22—laser beam
 X25—length between centers of laser emitter X20 and photosensor X30
 X30—photosensor
 X32—reflection of laser beam X22
 X40—remote object
 X42—retroreflective surface
 X44—actuator
 X50—direction
 X60—network
 X70A-N—client device(s)
 X80—remote server
 X82—database
 X90—expansion module
 X92—sensor
 X94—actuator

SUMMARY

In one aspect, a device detecting whether a remote object is in a predetermined position comprises a processor and a memory. The device also comprises a laser emitter and a photosensor communicatively coupled to the processor. A surface of the remote object comprises a retroreflective portion. The laser emitter and the photosensor are oriented such that a laser beam emitted by the laser emitter points substantially at the retroreflective portion and is reflected by the retroreflective portion such that a portion of the reflection is detected by the photosensor. The memory comprises instructions that when executed by the processor, cause the device to detect whether the remote object is in a predetermined position. Said instructions cause the device to calculate, through the processor, a difference between a pair of light intensity measurements measured by the photosensor. The instructions also cause the device to detect, through the processor, whether the difference exceeds a threshold value.

In another aspect, a computer-implemented method for detecting whether a remote object is in a predetermined position involves calculating, through a processor of a device communicatively coupled to a photosensor and a laser emitter, a difference between a pair of light intensity measurements measured by the photosensor. The method also involves detecting, through the processor, whether the difference exceeds a threshold value. A surface of the remote object comprises a retroreflective portion. The laser emitter and the photosensor are oriented such that a laser beam emitted by the laser emitter points substantially at the retroreflective portion and is reflected by the retroreflective portion such that a portion of the reflection is detected by the photosensor.

In yet another aspect, a system is configured to detect whether a remote object is in a predetermined position. The system comprises a controller. The controller comprises a processor, a memory, a laser emitter, and a photosensor. Both the laser emitter and the photosensor are communicatively coupled to the processor. The laser emitter and the photosensor are oriented such that a laser beam emitted by the laser emitter points substantially at a retroreflective portion of the remote object and is reflected by the retroreflective portion such that a portion of the reflection is detected by the photosensor. The memory comprises instructions that, when executed by the processor, cause the controller to detect whether the remote object is in a predetermined position. Said instructions cause the controller to calculate, through the processor, a difference between a pair of light intensity measurements measured by the photosensor. The instructions also cause the controller to detect, through the processor, whether the difference exceeds a threshold value.

DETAILED DESCRIPTION

Various controllers are disclosed herein that detect whether or not a remote object is in a predetermined position, among other functions. Examples used herein are provided in an illustrative fashion, and are not to be interpreted in a restrictive sense.

In the embodiments described below, a controller emits a laser through a laser emitter at the remote object and measures an intensity of light reflected back to the controller through a photosensor disposed in close proximity to the laser emitter. In some embodiments, the surface of the remote object may comprise a retroreflective portion (hereinafter a 'retroreflective surface'), which reflects most of the laser beam's light in the direction from which it came. Such retroreflective properties may be achieved through any reflective or retroreflective object or objects used alone or in concert, such as retroreflective tape, systems of mirrors and prisms, retroreflective coating, and others. As such, "retroreflective surface" refers to any object(s) that, used alone or in concert, reflects light in the direction from which it came.

In some embodiments, a predetermined position of the remote object is detected when the intensity of light measured by the photosensor reaches a threshold level. The threshold level may be substantially similar to the light intensity reading of the laser beam itself, or a different value. The retroreflective surface is configured such that when the remote object is not in the predetermined position, the intensity of the reflected laser light becomes diminished due to a scattering of the light when the laser beam is incident on any non-retroreflective portion of the remote object.

In some embodiments, when the remote object is in the predetermined position, the laser beam may be incident on a non-retroreflective portion of the remote object. In other embodiments, the portion on which the laser beam is incident may be a matte surface that absorbs or diffuses light maximally, causing a light intensity reading by the photosensor of a reflection of the laser beam to be minimal. In any case, the portion of the remote object on which the laser light is incident when the remote object is in the predetermined position may be proportionately more or less reflective than the rest of the remote object.

Referring to FIG. 1, a block diagram of a controller 100 for determining position of a remote object is illustrated. As shown, the controller 100 comprises a microcontroller 110 communicatively coupled to a laser emitter 120 and a photosensor 130. The microcontroller 110 may incorporate at least one processor (e.g. a CPU, a GPU) and at least one memory (e.g. volatile and nonvolatile memory such as a hard disk drive, flash memory, EEPROM, etc.) and may execute, through the processor, one or more instructions stored in the memory.

Figure 2:
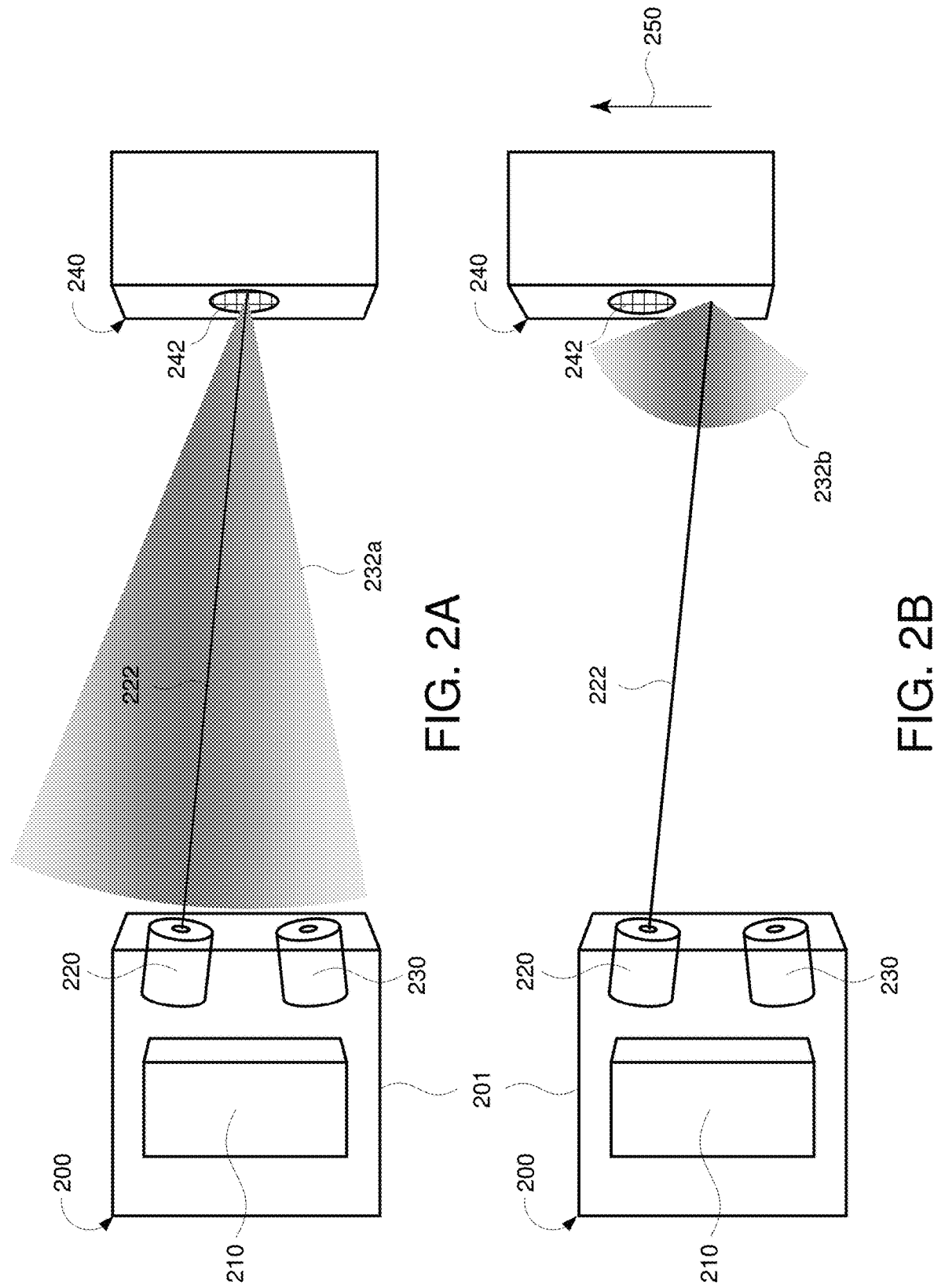
FIGS. 2A-B show a demonstration of position detection by the controller of FIG. 1.

Referring to FIG. 2A, operation of the controller 200 is illustrated. In one embodiment, the microcontroller 210 may execute, through the processor of the microcontroller 210, one or more instructions stored in the memory of the microcontroller 210, causing the microcontroller 210 to issue a control signal to the laser emitter 220 (subsequently causing the laser emitter 220 to emit a laser beam 222), and a control signal to the photosensor 230 (subsequently causing the photosensor 230 to measure light intensity). The laser emitter 220 may be disposed within the controller 200 and the controller 200 may be oriented such that the laser beam 222 is directed substantially at a retroreflective surface 242 of a remote object 240 (i.e. the laser beam 222 strikes any part of the retroreflective surface 242). The reflection 232a of the laser beam 222 may be directed substantially back to the laser emitter 220. Though the intensity of the reflection 232a is highest at the laser emitter 220, the reflection may diverge somewhat due to typical beam divergence, but also due to scattering by the retroreflective surface 242. As long as the laser emitter 220 is in close proximity to the photosensor 230, the light intensity reading of the reflection 232a measured by the photosensor 230 may be utilized to determine whether the remote object 240 is in a predetermined position.

The retroreflective surface 242 may be any surface that is configured to reflect light in substantially the same direction from which it came with minimum scatter. Other surfaces may be used, such as a mirror, but the orientation of such merely reflective surfaces would need to be maintained regularly to ensure reliable readings. For example, if a mirror is to be used to reflect the laser beam 222 to the photosensor 230, the mirror must always be oriented so as to direct the reflection to the photosensor 230. Even if the reflective surface scatters the beam, the scatter would not be concentrated so close to the laser emitter 220. When correctly positioned, even the slightest change in the mirror may render the controller 200 unreliable until cleanliness and correct position/orientation of the mirror relative to the controller 200 is reestablished.

On the other hand, the retroreflective surface 242 may move or be turned to some extent without causing the reflection to be diminished to the same degree if merely a reflective surface is used. As such, the angle at which the laser beam 222 coincides with the retroreflective surface 242 may be adjusted to a limited degree without considerably compromising the light intensity of the reflection 232a. By contrast, a merely reflective surface would lose reliability at the slightest disturbance. Thus, a reflective surface has an extremely low tolerance compared to that of the retroreflective surface 242. To further improve the light intensity reading, the laser emitter 220 and the photosensor 230 are ideally housed within the controller 200 in close proximity so as maximize utility of the laser beam's narrow divergence and minimal scatter from the retroreflective surface 242. Thus, the retroreflective surface 242 allows flexible relative positioning of the controller 200 relative to the retroreflective surface 242, contributing to the controller 200's reliability and ease of installation and maintenance.

The remote object 240 may be any object, the positioning of which is desired to be monitored through the controller 200. For example, the remote object 240 may be a door (e.g. a garage door, a front door, a back door, a vault door, a hallway door), a gate, or a window. Or the remote object 240 may be one or more walls and/or windows of a room. Or the remote object 240 may be a vehicle and the positioning of the vehicle in a parking spot may be monitored. The remote object 240 may have a portion that is retroreflective, may have a retroreflective coating, or may have a portion of its surface covered by a retroreflective tape. The position of any number and type of remote objects having a retroreflective portion may be monitored and such objects are within the scope of the exemplary embodiments described herein.

Alternately, the controller 200 itself may be the object of detection, i.e. the position of the controller 200 may be monitored. In such an example, the remote object 240 may be stationary.

Figure 3:
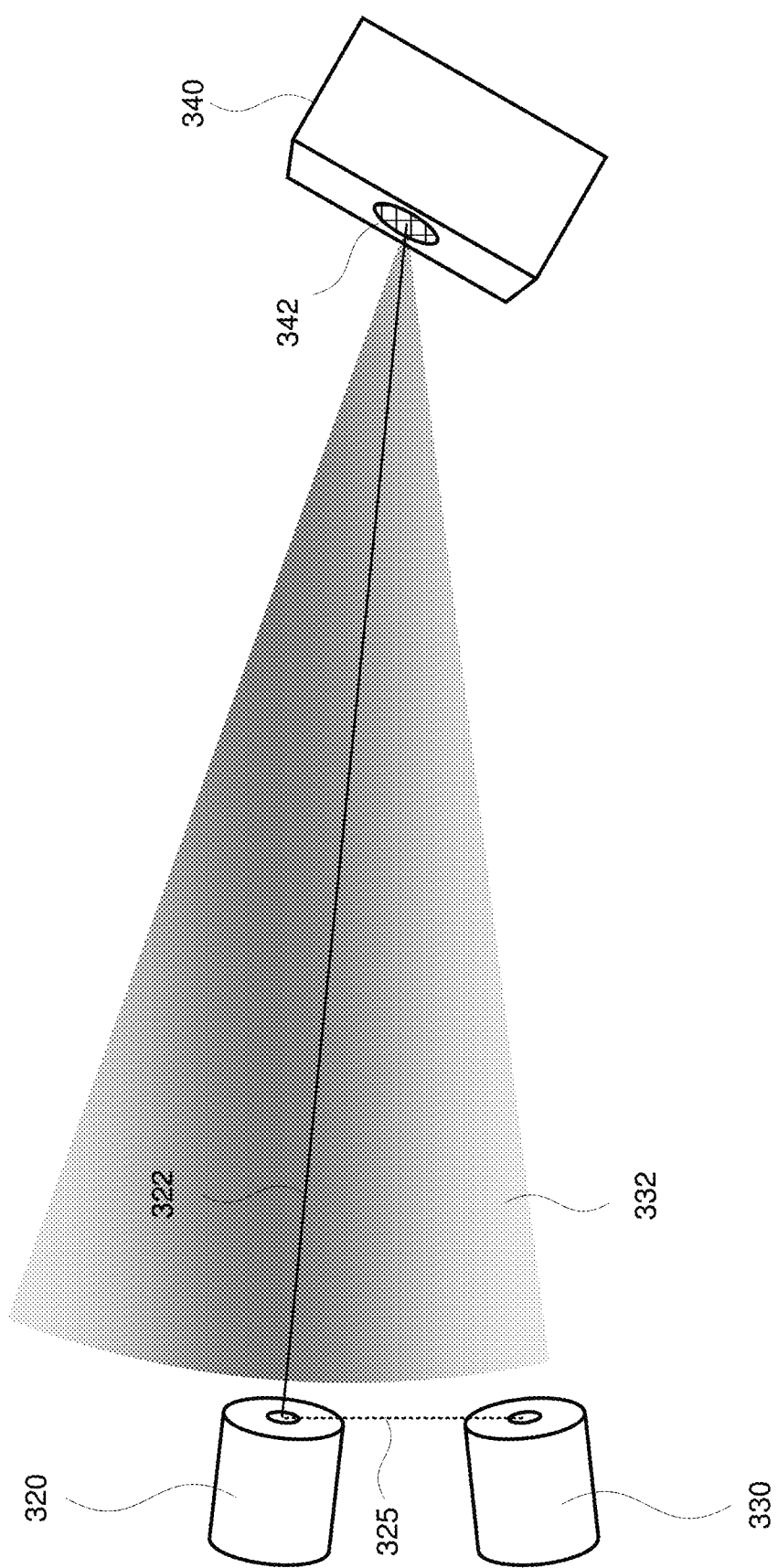
FIG. 3 shows the orientation details of the components of the controller shown in FIGS. 2A-B.

Referring now to FIG. 3, orientation details of components shown in FIGS. 2A-B are illustrated. In FIG. 3, the laser beam 322 is emitted from the laser emitter 320 to the retroreflective surface 342, which reflects the laser beam 322 substantially to the laser emitter 320. However, due to beam divergence and beam scattering, the reflection 332 is wide enough to be measured reliably by the photosensor 330. The reflection 332 is most intense along the path of the initial laser beam 322, so in order to measure a similar light intensity, the laser emitter 320 is ideally as close as possible to the photosensor 330, i.e. distance 325 is minimized.

In situations like those shown in FIG. 3, the retroreflective surface 342 may not always face the controller 200. However, the light intensity reading of the reflection 332 may still be reliable when the retroreflective surface 342 does not face the controller 200. When the retroreflective surface 342 faces further away from the laser emitter 322, the width of the reflection 332 grows larger due to increased scattering. Thus, the light reaching the photosensor 330 will be comparatively less intense due to increased scattering. However, light intensity would still be most intense around the path of the initial laser beam 322, so minimizing the distance 325 between the laser emitter 320 and the photosensor 330 minimizes the negative effect of scattering on the light intensity readings. Due to the nature of the retroreflective surface 342, the retroreflective surface 342 may face up to, for example, thirty degrees away from the path of the laser beam 322 and the light intensity of the reflection 332 may still be substantially similar to that of the laser beam 322. Thus, the controller 300 may still reliably determine the position of the remote object 340 despite the effects of beam divergence, scattering, ambient light, and to some extent, the presence of other sources of light pointing at the photosensor 330.

Referring to FIGS. 2A-B and FIG. 3, the preferred range of distance between the controller 200 and the remote object 240 may be largely affected by the reliability of the controller 200 with respect to the relative orientation of its components as described above, but also by any of the following factors: the power of the laser emitter 220, the sensitivity of the photosensor 230, the divergence of the laser beam 222, the length 325 between the laser emitter 220 and the photosensor 230, the presence and intensity of ambient light, the presence and intensity of other lights pointing substantially toward the photosensor 230. Other factors may also affect the preferred range of distance. For example, a controller 200 having a 5 mW laser emitter 320, a length 325 of about 1 cm, and a retroreflective surface 342 facing up to thirty degrees away from the laser emitter 320 may yield reliable results. However, the above parameters may be altered significantly without compromising reliable position detection. For example, a weaker or stronger laser emitter 320 may be used, the laser emitter 320 and photosensor 330 may be further apart or closer, or the reflective surface 342 may face further away from or toward the laser emitter 320 and photosensor 330. As such, the above embodiment is only one preferred embodiment and constitutes one of many optimal configurations of the components of the controller 200 and the remote object 240.

In some situations, a source of ambient light may interfere with the light intensity readings of the photosensor 230 and cause the controller 200 to be unreliable, i.e. the light intensity reading may be substantially the same whether or not the remote object 240 is in the predetermined position.

In one embodiment, this interference may be prevented physically by blocking and thus diminishing the amount and/or intensity of any ambient light reaching the controller 200. For example, a circular portion of the housing 201 of the controller 200 around the photosensor 230 may be extruded from the housing 201 of the controller 200, creating a tunnel that may point substantially in the direction of a portion of the reflection 232a and thus minimize interference by peripheral sources of light. Alternately or in combination with the above embodiment, a lens hood may be installed that may drastically reduce ambient light. In another example, one or more aligned polarizing filters may be positioned over the laser emitter 220 and the photosensor 230 to suppress a significant portion of ambient light that is not polarized. In yet another example, the photosensor 230 may be positioned deeper within the housing 201 to minimize interference by peripheral sources of light.

In one or more embodiments, the controller 200 may incorporate a method for reducing interference by ambient light, thus improving the reliability of light intensity readings through the photosensor 230. Such a method involves determining a reflection rate, which is equal to the change in light intensity measurements before and after the laser emitter 220 is activated (or when the laser emitter 220 is activated and after the laser emitter 220 is deactivated). If the reflection rate is higher than a threshold value, then the remote object 240 is considered to be in position.

In one example in dark ambient light conditions, a first light intensity measurement by the photosensor 230 before the laser emitter 220 is activated may be around zero. A second light intensity measurement by the photosensor 230 after the laser emitter 220 is activated may be around 25 if the laser beam 222 is striking the retroreflective surface 242. The reflection rate would be equal to 25. Assuming a threshold of 10, the remote object 240 would be considered in position. If the laser beam 222 instead strikes a nonreflective surface or a merely reflective surface, the second light intensity measurement by the photosensor 230 may be zero or close to zero. Thus, the reflection rate would be below the threshold value and the remote object 240 would be considered not in position.

In another example in ambient light conditions, a first light intensity measurement by the photosensor 230 before the laser emitter 220 is activated may be around 50. A second light intensity measurement by the photosensor 230 after the laser emitter 220 is activated may be around 75 if the laser beam 222 is striking the retroreflective surface 242. The reflection rate would be equal to 25. Assuming a threshold of 10, the remote object 240 would be considered in position. If the laser beam 222 instead strikes a nonreflective surface or a merely reflective surface, the second light intensity measurement by the photosensor 230 may be around 50. Thus, the reflection rate would be below the threshold value and the remote object 240 would be considered not in position.

Calculation of the reflection rate causes the controller 200 to effectively measure the reflective properties of the surface reflecting the laser beam 222 by normalizing light intensity measurements across a number of measurements and factoring out the intensity of ambient light.

The above method may be repeated multiple times and the results averaged as needed to minimize the effects of coincidental changes in the intensity of the ambient light. For example, the reflection rate measurements may occur at a frequency of 5 Hz to minimize the effects of single coincidental events with a high probability.

In the preferred embodiment, the pair of light intensity measurements used to calculate the reflection rate comprises light intensity measurements that are measured in relatively close temporal proximity to each other. Light intensity measurements that are too far apart may not provide accurate results. As such, the pair of light intensity measurements that are used to calculate the reflection rate may be no more than 1000 milliseconds apart. However, the pair of light intensity measurements used to calculate the reflection rate should always comprise light intensity measurements measured before and after the laser emitter 220 is activated (i.e. a measurement is taken when the laser emitter 220 is off and another measurement is taken after the laser emitter 220 is activated) or light intensity measurements measured before and after the laser emitter 220 is deactivated (i.e. a measurement is taken when the laser emitter 220 is on and another measurement is taken after the laser emitter 220 is deactivated). For example, a reliable reflection rate may be calculated using a light intensity measurement measured at t=0 ms and a light intensity measurement measured at t=5 ms, assuming that the laser emitter was off at t=0 ms and activated between t=0 ms and t=5 ms. In the above pairs of light intensity measurements measured before and after the light emitter is activated or deactivated, averages of one or more light intensity measurements may instead be used. This may be preferable in case there are coincidental changes in ambient light that cause certain light intensity measurements to poorly represent the intensity of light over a period of time.

The above method may be embodied as a series of instructions stored in the memory of the microcontroller 210 and executed by a processor of the microcontroller 210. Alternately, the instructions may be stored in a memory of a remote server and communicated to the microcontroller 210 through a network.

Referring to FIG. 2B, operation of the controller 200 is illustrated. The controller 200 may determine when the remote object 240 is no longer in the predetermined position, e.g. the remote object 240 has moved in a direction 250 (e.g. upward, as shown in FIG. 2B). As such, the laser beam 222 may no longer be reflected (i.e. the surface of the remote object 240 absorbs the light) or the light intensity reading of the reflection 232*b* may be vastly diminished (i.e. the surface of the remote object 240 either absorbs a substantial portion of the light or reflects a substantial portion of the light, but scatters the light in a wide range). For example, the surface of the remote object 240 may be a matte surface and may absorb a substantial portion of the light and scatter the remaining portion (as in FIG. 2B). Thus, the light intensity reading of the reflection 232*b* measured by the photosensor 230 is different from the light intensity of the reflection 232*a*. The degree of difference in the light intensities, and thus the threshold used to detect the change in position, may depend on how reflective the non-retroreflective portion of the remote object 240 is.

This change in the light intensity reading may be associated with a change in the position of the remote object 240 and as such, the microcontroller 210 of the controller 200 may be configured to detect this change in the light intensity reading and communicate a notification of a change in position of the remote object 240 to a data processing device such as a remote server and/or a client device.

The remote object 240 may change position, e.g. move in any direction. Thus, the position change shown in FIG. 2B (movement in direction 250) is presented in an illustrative, not in a restrictive sense. For example, the remote object 240 may be a gate and may typically move horizontally or parallel to the ground. In another example, the remote object 240 may be a window that slides vertically or a window that hinges away from the plane of the closed window.

In the exemplary embodiment shown in FIG. 2B, the controller 200 may be oriented such that the laser emitter 220 emits a laser beam 222 at a non-retroreflective surface of the remote object 240 that is integral to or affixed to a portion of a remote object 240 when the remote object 240 is in a position other than the predetermined position. Once the remote object 240 is in a position other than the predetermined position (as shown in FIG. 2A), the laser beam 222 may no longer be reflected or the laser beam 222 may be minimally reflected. As such, in the position of the remote object 240 shown in FIG. 2B, the reflection 232*a* of FIG. 2A may instead be replaced with a diminished reflection 232*b* of the laser beam 222. As such, the light intensity of the diminished reflection 232*b* may be substantially less than the light intensity of the laser beam 222 and also substantially less than the reflection 232*a* of the laser beam 222.

Figure 4:
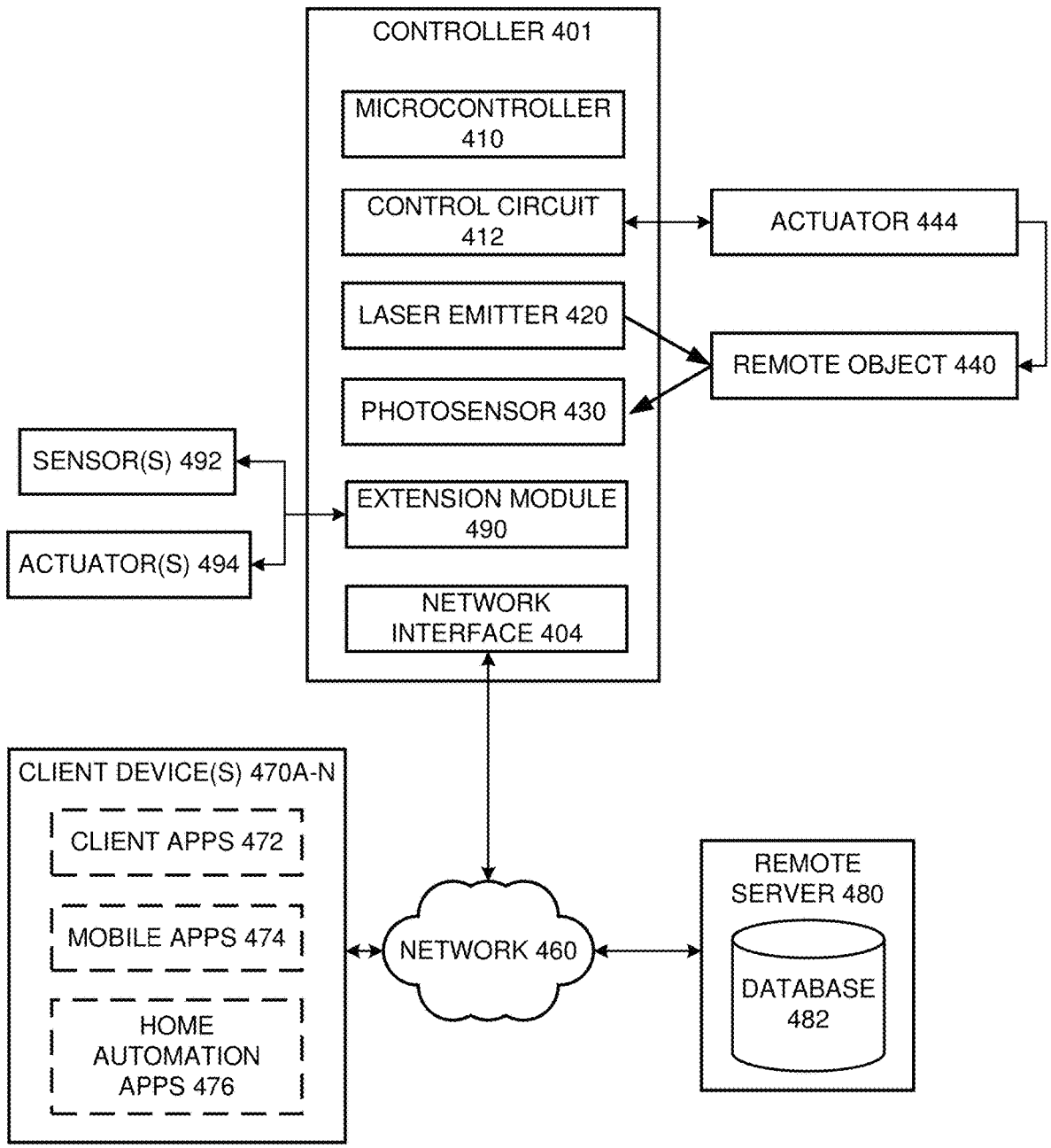
FIG. 4 is a network diagram showing interactions between components of various networked components, including the controller, a remote server, and client devices.

Referring to FIG. 4, a network diagram showing interactions between components of various networked devices, including the controller 400, a remote server 480, and client device(s) 470A-N is illustrated. The controller 400 may additionally comprise a control circuit 412, a network interface 404, the microcontroller 410, the laser emitter 420, the photosensor 430, and an extension module 490. 'Module' in this respect may refer to any means of expanding the functionality of controller 400 by providing a means of interconnecting with the processor and/or the memory of the microcontroller 110, e.g. through GPIO headers of the microcontroller 410, a USB controller of the microcontroller 410, a serial bus, or any other interconnection known by a person of ordinary skill in the art to be compatible with the microcontroller 410.

The network interface 404 allows the controller detector 400 to establish a connection with client device(s) 470A-N and the remote server 480 through the network 460. The established connection may facilitate communication of a notification of a position change of the remote object 440 or communication of control signals to the controller 400, components of the controller 400, or devices communicatively coupled to the controller 400, e.g. through the extension module 490.

The control circuit 412 may be communicatively coupled to the microcontroller 410. The control circuit 412 may enable one or more control signals to be communicated to an actuator 444 communicatively coupled to the controller 400 through the control circuit 412.

In one embodiment, the controller 400 may be communicatively coupled to the network 460 (e.g. a personal network (such as Bluetooth™), a local area network (such as a wired or wireless local area network), a wide area network (e.g. the Internet), or any other network) through the network interface 404 (e.g. on-board or external Wi-Fi™ adapter, Bluetooth™ chip, ethernet controller, etc.) of the controller 400. The network interface 404 may be incorporated within the microcontroller 410 or the network interface 404 may be a separate component of the controller 400 that is communicatively coupled to the microcontroller 410. In a preferred embodiment, the network interface 404 provides support for a secured Wi-Fi™ connection between the microcontroller 410 and the network 460. However, the controller 400 may be communicatively coupled to the network 460 through any wired or wireless means.

In one embodiment, the microcontroller 410 may be configured to execute, through the processor of the microcontroller 410, instructions stored in the memory to enable communication with the microcontroller 410 without the use of peripheral devices communicatively coupled to the microcontroller 410. For example, a client device 470 may be a mobile device comprising a display screen and may be configured to communicate Wi-Fi™ credentials to the microcontroller 410 by transferring Wi-Fi™ credential data encoded in a series of screen flashes (i.e. a bright screen representing the first binary level, a dark screen representing the second binary level). When the display screen of the client device 470 is placed facing the photo sensor 430 after the microcontroller 410 is initialized, the series of screen flashes may be received by the photosensor 430 and detected by the microcontroller 410 as a continuous or interrupted series of high and/or low light intensity readings, which may be decoded by the microcontroller 410 and the data utilized by the microcontroller 410 to configure, among any number of parameters for any components of the controller 400, a network configuration of the network interface 404. Alternately, data may be encoded as a series of flashes of different colors (e.g. any combination of red, green and blue), thus expanding the bit depth of the data communicated through the client device 470 to the microcontroller 410 through the series of flashes. Though the above method may be useful in configuring a network configuration of the network interface 404, this example is provided in an illustrative fashion—other parameters of any components of the controller 400 may be configured using the above method.

Optionally, communication may also proceed in the reverse direction by using the laser emitter 420 and a camera of the client device 470. In the above remote connection configuration example, confirmation of configuration success may be communicated to the mobile device by a series of flashes from the laser beam through the laser emitter 420. A camera of the client device 470 may receive the series of laser beam flashes and the processor of the client device 470 may be configured to recognize the flashes as such. In the above embodiment, the camera of the client device 470 may be a front-facing camera or a rear-facing camera. Other information may be communicated between the controller 400 and the client device(s) 470A-N through the above bi-directional communication embodiment without using peripheral devices.

The client device(s) 470A-N may be any number and type of personal computer (desktop computer, laptop computer, server, etc) or mobile device (such as a tablet or smartphone). The client device(s) 470A-N may also include home automation hubs, wearable devices, smart appliances, or any other network-enabled device that comprises at least a memory and a processor configured to execute instructions stored in the memory. The client device(s) 470A-N may be configured to execute any type of application, including applications that are configured to communicate through the network 460 with one or more components of the controller 400. Examples of such applications include, but are not limited to: client applications 472 specifically configured for use with the position detector 400 and/or components thereof; mobile apps 474 which may support and interact with the position detector 400 and/or components thereof; and home automation hub software 476 which may control and automate the operation of the position detector 400 and any number and type of home appliances such as thermostats, security, air conditioning units, lighting, ventilation, furnaces, and more.

The remote server 480 may comprise a processor and a memory (e.g. volatile memory, non-volatile memory) optionally comprising at least one database 482. The remote server 480 may store data related to the position of the remote object 440 and communicated to the remote server 480 by the controller 400 through the network 460. The database 482 may incorporate any database schema that optimally stores and organizes data generated by the components of the position detector 400.

The remote server 480 may be configured to authenticate the controller 400 and client device(s) 470A-N, handle communications between the controller 400 and the client device(s) 470A-N, facilitate remote monitoring of the controller 400 by the client device(s) 470A-N, communicate event history to the client device(s) 470A-N (e.g. through push notifications), and perform other functions related to monitoring and control of the position of the remote object 440. The remote server 480 may further execute a web application providing a browser-based interface for accessing and adjusting various functions of the controller 400 (e.g. through the Internet). Thus, a description of the position of the remote object 440 may be viewable through any client device(s) 470A-N with a secure connection to the web application through the network 460. Users of varying security levels may be provided differential access to the various functionalities of the controller 400 through the web application or through any client apps 472, mobile apps 474 or home automation apps 476.

In one embodiment, the network system illustrated in FIG. 4 and described above may enable communications between the controller 400, client device(s) 470A-N, and remote server 480 comprising: pushing a notification describing a change in position of the remote object 440 from the position detector 400, through the network 460, and to the client device(s) 470A-N; one or more control signals from the client device 470 to the control circuit 412 to effect a change in the operation of the actuator 444, and/or the actuator(s) 494; reading a value generated through photosensor 430, sensor(s) 492, or any other sensor involved with position detection; operating the laser emitter 420 or other device related to position detection; adding, deleting, or updating data stored in the memory of the microcontroller 410 (e.g. updating firmware or modifying a parameter of any connected device) or the remote server 480; detecting communicative coupling of any sensor 492 or actuator 494 through the extension module 490 and providing driver support for the sensor(s) 492 or actuator(s) 494 as needed; reading relevant data stored in the memory of the microcontroller 410; and more.

In one embodiment, the controller 400 may detect that the remote object 440 has changed its position (e.g. has moved out of or is otherwise not in the predetermined position), as described above and illustrated in FIGS. 2A-B. The controller 400 may be configured to communicate a notification that the remote object 440 has changed position to the remote server 480. The notification may be stored temporarily in the memory of the microcontroller 410 and/or may be stored in the memory of the remote server 480 (optionally the database 482). The client device(s) 470A-N may execute a client application 472 configured to receive push notifications from the remote server 480, the push notifications comprising at least a description of the stored position of the remote object 440 (e.g. "the garage door is open"). The application may be further configured to display the description of the position through a display screen of the client device(s) 470A-N. Thus, a user of the client device(s) 470A-N may be notified of the change in the position of the remote object 440.

In another embodiment, the control circuit 402 may be communicatively coupled to an actuator 444. The control circuit 402 may comprise any means of integrating with the particular actuator 444 and thus includes any means required to relay control signals to the actuator 444. For example, the control circuit 402 may utilize a reed relay to operate the actuator 444. Other means may be used to effectuate control signals through any wired or wireless protocol, e.g. utilizing a serial connection to the actuator 444 or one or more GPIO headers of the microcontroller 410 to communicate with the actuator 444.

The actuator(s) 444 may refer to any device(s) configured to change the position of the remote object 440. For example, the actuator(s) 444 may comprise a garage door opener and the remote object 440 may be a garage. In another example, the actuator(s) 444 may comprise an electric linear actuator coupled to the remote object 440, which may be an openable window. Thus, the actuator(s) 444 may be any device(s) that may affect the position of the remote object 440 through any physical means upon receiving the appropriate control signal. In one embodiment, the controller 400 may receive a communication from the remote server 480 and/or the client device(s) 470A-N to communicate a control signal to the control circuit 402 to operate the actuator 444 and subsequently, to effect a change in the position of the remote object 440. The communication to the controller 400 to propagate the control signal may be manual (e.g. user-controlled) or automatic (e.g. scheduled or reactive communication through the remote server 480). Thus, a user may remotely monitor and/or change the position of the remote object 440 through any application executed by the client device(s) 470A-N that is configured to do so.

The extension module 490 may provide the controller 400 a connection means and general access to any number and/or type of sensor 492 or actuator 494. For example, sensor 492 may generate data relating to temperature, pressure, humidity, motion, smoke, fire, carbon monoxide, vehicle position, position of a remote object, etc. For example, actuator 494 may be associated with a light-emitting device, a servo, a siren, a motor, fire extinguishing means, a fan, any home appliance, or any other device. Though actuator 444 may be particularly suited to controlling remote object 440, actuator(s) 494 may be suited for any function. As such, the controller 400 may be a modular system that can be expanded and adjusted by a user according to the user's needs.

In some embodiments, the controller 400 may comprise further means of detecting the position of the remote object 440 and/or different means of detecting the position of the remote object. For example, the controller 400 may comprise a plurality of laser emitters, each of the laser emitters configured to emit a laser beam at one or more retroreflective surfaces. In another embodiment, multiple laser emitters may emit a laser beam at a single retroreflective surface.

In one embodiment, the controller 400 may determine that the remote object 440 is transitioning between a range of positions based on a sequence of light intensity readings corresponding to laser light reflected throughout the range of positions. The range of positions may be segmented into multiple discrete positions, each position associated with a separate retroreflective surface affixed to separate portions of the remote object 440. The separate retroreflective surfaces may be oriented so as to differentially affect the light intensity of the reflection. For example, when the remote object 440 is in a closed position, the reflection rate may be about 30 (compared to a threshold value of 10). When the remote object 440 is in a 25% open position, the reflection rate may be about 25. When the remote object 440 is in a 50% open position, the reflection rate may be about 20. When the remote object 440 is in an open position, the reflection rate may be about 10.

The range of light intensity readings throughout the various positions of the remote object 440 may largely depend on the degree of change in position of the remote object 440, the degree of change in the orientation of the remote object 440 (and thus the change in the orientation of the retroreflective surface 442) throughout the various positions, the amount of ambient light present throughout the various positions, and the positioning of all emitters and sensors.

In another embodiment, a plurality of retroreflective surfaces may reflect different wavelengths of light and the microcontroller 410 may be configured to recognize a position of the remote object 440 associated with the specific wavelength of light reflected by the retroreflective surfaces and measured by the photosensor 430. For example, a first retroreflective surface may reflect red light which may be associated with a first position, a second retroreflective surface may reflect green light which may be associated with a second position, and a third retroreflective surface may reflect blue light which may be associated with a third position. Further retroreflective surfaces affixed to the remote object 440 may filter particular combinations of the above wavelengths of light when the laser beam strikes the particular retroreflective surfaces.

These and other embodiments may optimize the operation of the controller 400 and/or expand the number and/or type of positions of one or more remote objects that are detectable through the controller 400. For example, a plurality of laser emitters and/or photosensors may enable more than one position of a door with a predictable movement pattern to be tracked substantially throughout its range of motion by orienting the various laser beam emitters at the retroreflective surfaces associated with the various positions desired to be tracked. Accordingly, the remote server 480 and/or the controller 400 may be configured to push a notification to the client device(s) 470A-N if the remote object 440 is stuck in an intermediate position.

For example, if the remote object 440 is a garage door and is obstructed somewhat, the garage door may be unable to close, and notification to that effect may be communicated to a user through the user's client device 470. Once alerted, the user may manually remove any obstruction and cause the garage door to proceed to a fully closed position. Or the user may activate an actuator 494 that may be specifically configured to remove obstructions.

An infrared, normal, or day/night camera may be communicatively coupled to the controller 400 to allow the user to view a video data stream communicated to the client device 470 through the network 460. In the same embodiment, an image recognition client app executed by the client device(s) 470A-N may allow detection and/or recognition of objects captured through the camera. For example, the image recognition client app may be configured to detect the presence and movement of a specific type of object (e.g. a car). Features of the object may also be recognized (e.g. the make/model of the car, the driver driving the car). Based on the determined features, notification of such detected features may be pushed to the client device(s) 470A-N.

The controller 400 is a modular platform that is expandable, customizable, reliable, and easy to maintain. A user of the controller 400 may add further actuators and/or sensors to effectuate more sophisticated position detection or enable position detection for any number and type of objects. For example, the remote server 480 may execute one or more applications providing alert notices or analytics that provide insight into position data provided by the controller 400 with respect to time. Such information may include an event history log, pictures accessible by date and time, notices and pictures of disrepair, theft alerts, presence and degree of water leaks, a consumption analysis of a particular utility or object, and other information.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments. In this regard, directional terminology, such as "vertical," "horizontal," "top," "bottom," "front," "back," "left," "right," etc., is used with reference to the orientation of the drawing(s) being described. Because components of the embodiments can be positioned in a number of different orientations, the directional terminology is used for purposes of illustration and is in no way limiting.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A device comprising:
   a processor and a memory;
   a laser emitter communicatively coupled to the processor and configured to emit a laser beam at a remote object comprising at least one retroreflective portion;
   a photosensor communicatively coupled to the processor, wherein the memory comprises instructions encoded on non-transitory media that when executed by the processor, cause the device to detect whether the remote object has changed its position, the instructions comprising:
      detecting a first light intensity measurement through the photosensor;
      toggling a power state of the laser emitter;
      detecting a second light intensity measurement through the photosensor; and
      detecting a threshold difference between the first light intensity measurement and the second light intensity measurement.

2. A computer-implemented method comprising:
   detecting, through a processor of a device communicatively coupled to a photosensor and a laser emitter, a first light intensity measurement through the photosensor, wherein the laser emitter is configured to emit a laser beam at a retroreflective portion of a remote object;
   toggling a power state of the laser emitter;
   detecting a second light intensity measurement through the photosensor; and
   detecting a threshold difference between the first light intensity measurement and the second light intensity measurement.

3. A system comprising:
   a controller comprising:
      a processor;
      a memory;
      a laser emitter communicatively coupled to the processor and configured to emit a laser beam at a retroreflective portion of a remote object;
      a photosensor communicatively coupled to the processor
         wherein the memory comprises instructions encoded on non-transitory media that, when executed by the processor, cause the controller to detect whether the remote object has changed its position, the instructions comprising:
            detecting a first light intensity measurement through the photosensor;
            toggling a power state of the laser emitter;
            detecting a second light intensity measurement through the photosensor;
            determining whether the remote object is in the predetermined position based on detecting a threshold difference between the first light intensity measurement and the second light intensity measurement.

* * * * *